(12) United States Patent
Aoki et al.

(10) Patent No.: US 7,722,789 B2
(45) Date of Patent: May 25, 2010

(54) DEFOAMING METHOD, DEFOAMING DEVICE AND MANUFACTURING METHOD OF TRANSFER MOLD

(75) Inventors: Toru Aoki, Kanagawa Prefecture (JP); Hiroshi Kikuchi, Kanagawa Prefecture (JP); Akira Yoda, Tokyo (JP)

(73) Assignee: 3M Innovative Properties Company, Saint Paul, MN (US)

( * ) Notice: Subject to any disclaimer, the term of this patent is extended or adjusted under 35 U.S.C. 154(b) by 75 days.

(21) Appl. No.: 11/947,918

(22) Filed: Nov. 30, 2007

(65) Prior Publication Data

US 2009/0140448 A1 Jun. 4, 2009

(51) Int. Cl.
*B01D 19/00* (2006.01)
(52) U.S. Cl. .................. 264/102; 264/220; 264/299; 269/21
(58) Field of Classification Search ................. 264/102, 264/219, 220, 299, 405, 494, 496; 269/21
See application file for complete search history.

(56) References Cited

U.S. PATENT DOCUMENTS

| 4,948,537 A * | 8/1990 | Ohkoshi et al. ............. 264/2.5 |
| 6,439,869 B1 * | 8/2002 | Seng et al. .................... 425/89 |
| 2005/0156346 A1 | 7/2005 | Yu et al. |
| 2005/0206034 A1 * | 9/2005 | Yokoyama et al. .......... 264/219 |
| 2005/0264134 A1 * | 12/2005 | GanapathiSubramanian et al. .......................... 310/311 |
| 2006/0043638 A1 | 3/2006 | Corrigan et al. |

FOREIGN PATENT DOCUMENTS

| JP | 61-258239 | 11/1986 |
| JP | 11-096903 | 4/1999 |
| JP | 2000/098352 | 4/2000 |
| JP | 2000/171779 | 6/2000 |
| JP | 2001/191345 | 7/2001 |
| JP | 2002/015663 | 1/2002 |
| JP | 2002/187135 | 7/2002 |
| JP | 2004-160843 | 6/2004 |
| JP | 2005/149817 | 6/2005 |
| JP | 2005/329712 | 12/2005 |
| KR | 1993-0006848 | 7/1993 |
| KR | 2003-0060841 | 7/2003 |

* cited by examiner

*Primary Examiner*—Kat Wyrozebski
*Assistant Examiner*—Scott W Dodds

(57) ABSTRACT

A defoaming method for removing air bubbles from a curable resin material and a contact portion of the resin material with an irregular structure of a flat metallic mold. The mold includes a fine structural region having a fine irregular structure and a flat region in the periphery of the fine structural region. The curable resin material is applied to the irregular structure of the fine structural region, filling the irregular structure with the resin material.

6 Claims, 8 Drawing Sheets

DEFOAMING METHOD, DEFOAMING DEVICE AND MANUFACTURING METHOD OF TRANSFER MOLD

TECHNICAL FIELD

The present invention relates to a defoaming method and a defoaming device. More particularly, the present invention relates to a defoaming method and a defoaming device for removing air bubbles from a curable resin material and an irregularity structural portion of an original shaping mold, which will be referred to as a "flat metallic mold" hereinafter, in the production of a transfer mold of a three (3)-dimensional structure having a fine irregularity structure on the surface thereof from a curable resin material. The present invention also relates to a method of manufacturing a transfer mold, used for transfer, having on a surface thereof a fine irregularity structure of a three dimensional structure corresponding to the flat metallic mold, by the transfer technique, wherein a curable resin material is filled in the flat metallic mold having a fine irregularity structure on the surface with using the above defoaming method. The transfer mold of the present invention can be advantageously used for making barrier ribs, i.e., fine structural bodies such as a PDP ribs on a back surface panel of a plasma display panel (PDP).

BACKGROUND

As well known in the art, PDP is characterized in that it is a thin type, and a large image can be displayed on it. Therefore, PDP is used for business and domestic use, for example, in the form of a wall-hung television set. PDP usually includes a large number of fine discharge display cells. As schematically shown in FIG. 1, each discharge display cell 156 is defined being surrounded by a pair of glass substrates, which are opposed to each other, that is, surrounded by a front glass substrate 161 and a back glass substrate 151, and also surrounded by a fine structural rib 154 which are referred to as a barrier rib or a separation wall. On the front glass substrate 161, there are provided a transparent display electrode 163 formed of a scanning electrode and a maintaining electrode, a transparent dielectric layer 162 and a transparent protective layer 164. On the back glass substrate 151, there are provided an address electrode 153 and a dielectric layer 152. Each discharge display cell 156 has a fluorescent body layer 155 on the inner wall. Further, a rare gas, for example, Ne—Xe gas is enclosed in each discharge display cell 156. Therefore, each discharge display cell 156 can make a display by itself when a plasma discharge is made between the above electrodes. Therefore, light can be emitted from itself. In this connection, to the manufacture of PDP shown in the drawing, it is possible to advantageously apply the present invention which will be explained in detail below. In this connection, PDP rib is commonly made of a fine ceramic structural body and formed into a matrix-shaped pattern or a delta(meandering)-shaped pattern. PDP rib can be advantageously manufactured by using a flexible mold.

In Japanese Unexamined Patent Publication (Kokai) No. 2004-160843, the present inventors has proposed a flexible mold, which is advantageously used for forming PDP ribs, and a manufacturing method of PDP ribs using the flexible mold. According to this invention, a flexible mold having a support body and a shaping layer, which has a groove pattern of a predetermined shape and size on the surface, can be manufactured by the following transfer method which comprises the steps of:

forming a photo-curable material layer upon coating of a photo-curable material at a predetermined film thickness on a metallic mold having a protrusion pattern, the shape and size of which correspond to a groove pattern of the mold;

forming a laminated body of the metallic mold, the photo-curable material layer and a transparent support body by laminating the support body composed of a film of the plastic material on the metallic mold;

curing the photo-curable material layer by irradiating light onto the laminated body from the support body side; and releasing the resulting shaped layer, which has been formed by curing the photo-curable material layer, from the metallic mold together with the support body.

However, according to the recent investigation by the present inventors, the following matters were found in the method described above. In the case where the flexible mold is manufactured in the way described above, since the photo-curable material is only coated on the metallic mold, air bubbles are incorporated into the resulting photo-curable material layer, and thus it becomes impossible to accurately executing transferring. Especially, in the case of the metallic mold used in this invention, since a larger number of fine protrusions are vertically arranged, when air bubbles are generated in this fine protrusion portion, it is difficult to defoam. Further, it was also found that it is necessary to hold the metallic mold at a high flatness during defoaming and transferring executed after defoaming. That is, when the flatness of the metallic mold is deteriorated, irregularities caused by the deterioration of the flatness are transferred onto the resulting mold as they are and the dimensional accuracy of a distance between ribs is greatly affected.

According to Japanese Unexamined Patent Publication (Kokai) No. 2002-15663, the following method is proposed, as schematically shown in FIG. 2, in the manufacturing of PDP, after a glass substrate 256, on which a dielectric glass paste 255 has been coated, is set on a setting table 253 of a decompressing leveling device 250, a decompressing pump 252 is operated. Due to the operation of the decompressing pump 252, an inner space 254 in a container 251 is put into a decompressed condition. In this patent publication, it is reported that air bubbles 257 existing in the glass paste 255 can be defoamed toward the inner space 254 in the container 251 as shown by the arrow 258 in the drawing. In this method, a whole portion of the glass substrate 256 is covered with the decompressing leveling device 250. In this patent publication, there is no description about the problem that the photo-curable material spreads onto the back side of the metallic mold and the flatness of the metallic mold is deteriorated.

Although it does not propose the manufacture of PDP ribs, Japanese Unexamined Patent Publication (Kokai) No. 2002-187135, as shown in FIG. 3 in order, proposes a method of manufacturing Fresnel's sheets made of silicon resin. First of all, as shown in FIG. 3A, a metallic mold 310 having a pattern corresponding to an objective Fresnel's sheet is prepared. Next, as shown in FIG. 3B, a curable silicone resin 320 is injected onto a metallic mold 310. Further, an aluminum sheet 360 is laminated on it. The silicone resin 320 is subjected to vacuum defoaming and then returned to the atmospheric pressure and hardened at the room temperature. When the silicone resin 320 is peeled off from the metallic mold, the aluminum sheet 360 having the Fresnel's sheet 321 can be obtained as shown in FIG. 3C. In this patent publication, there are no descriptions about the spread of resin and the deformation of the metallic mold, either.

SUMMARY OF THE INVENTION

The present invention has been intended to solve the above problems of the prior art. An object of the present invention is to provide a defoaming method and a defoaming device for removing air bubbles from a curable resin material and from a contact portion of the resin material with an irregularity structure of a flat metallic mold which has a fine irregularity structural region and a flat region in the periphery of the fine irregularity structural region and which has the curable resin material applied thereto by filling the resin material into the irregularity structure of the fine structural region, which enable to remove a possibility that the resin material spreads onto the back side of the metallic mold and the flatness of the metallic mold is deteriorated, and a possibility that the metallic mold is deformed.

It is another object of the present invention to provide a method of manufacturing a transfer mold (shaping mold) which is especially advantageously used for manufacturing PDP ribs, with high accuracy and at a high yield. Still another object of the present invention is to provide such a manufacturing method capable of reducing manufacturing steps without using complicated fabrication steps and without requiring a skill.

These and other objects of the present invention will be easily understood from the following detailed descriptions.

According to one aspect thereof, the present invention provides a defoaming method for removing air bobbles from a curable resin material and a contact portion of the resin material with an irregularity structure of a flat metallic mold which comprises a fine structural region having a fine irregularity structure and a flat region in the periphery of the fine structural region and which has the curable resin material applied to the irregularity structure of the fine structural region, thereby filling the irregularity structure with the resin material, and the defoaming method comprises the steps of:

setting the metallic mold on a mold platen having suction holes, which penetrate the mold platen in the thickness direction, so that the suction holes are blocked by the metallic mold;

fixing the metallic mold onto the mold platen by suctioning it with at least one first vacuum device communicated with the suction holes; and decompressing an airtightly closed space by suctioning it with at least one second vacuum device communicated with the airtightly closed space, the air tightly closed space being defined on an upper face of the fine structural region in the surface of the metallic mold, under the fixation of the metallic mold onto the mold platen, thereby conducting defoaming.

According to another aspect thereof, the present invention provides a deforming device for removing air bubbles from a curable resin material and a contact portion of the resin material with an irregularity structure of a flat metallic mold, comprising:

a flat metallic mold which comprises a fine structural region having a fine irregularity structure and a flat region in the periphery of the fine structural region and which has the curable resin material applied to the irregularity structure of the fine structural region, thereby filling the irregularity structure with the resin material, a mold platen having suction holes, which penetrate the mold platen in the thickness direction, so that the suction holes are blocked by the metallic mold;

at least one first vacuum device communicated with the suction holes;

a lid body, the shape and the size of which are sufficient to cover only the fine structural region, provided on a surface of the metallic mold; and at least one second vacuum device communicated with the airtightly closed space.

Further, according to still another aspect thereof, the present invention provides a method of manufacturing a transfer mold for manufacturing a fine structural body comprising the steps of:

preparing a mold platen having suction holes respectively penetrating the mold platen in the thickness direction, the mold platen having at least one first vacuum device communicated with the suction holes;

preparing a flat metallic mold having on a surface thereof a fine structural region having a fine irregularity structure, and a flat region in the periphery of the fine structural region;

setting the metallic mold on the mold platen so that the suction holes are blocked by the metallic mold;

filling the irregularity structure with a curable resin material applied to the irregularity structure;

setting a lid body on a surface of the metallic mold, the lid body having an appropriate shape and size sufficient to cover only the fine structural region so as to define an airtightly closed space, and being provided with at least one second vacuum device communicated with the airtightly closed space;

removing air bubbles from the curable resin material and a contact portion of the resin material with the irregularity structure by decompressing the airtightly closed space through suctioning it with the second vacuum device in the airtightly closed space under the condition that the metallic mold is fixed onto the mold platen by suctioning it with the first vacuum device;

forming a lamination body of the metallic mold, the resin material and a sheet-like support body for use in the transfer mold by laminating the support body on the defoamed resin material;

forming a shaping layer having a surface pattern corresponding to the fine structural region and the flat region of the metallic mold upon curing of the resin material; and releasing the shaping layer from the metallic mold, together with the support body integrally bonded to the shaping layer.

As can be understood from the following detailed explanations of the present invention, according to the present invention, as an airtightly closed space is defined only in a fine structural region having an irregularity structure on a surface of a flat metallic mold (a flat plate-type mold), there is no possibility that an end portion of the flat metallic mold, which portion is thin and has a large area, is raised by an air current during vacuum defoaming, and thus enabling to maintain the flatness of the metallic mold. Further, there is no possibility that air spreads into between the metallic mold and the mold platen which supports the metallic mold, thereby deteriorating the flatness of the metallic mold. Furthermore, as it becomes possible to prevent the occurrence of such a problem that the resin material flows outside the metallic mold and spreads into between the metallic mold and the mold platen, the flatness of the metallic mold can be maintained. Furthermore, since the airtightly closed space can be diminished, defoaming of resin material can be quickly carried out.

Furthermore, according to the present invention, as suction holes are provided on a mold platen on which the metallic mold is set and then vacuum defoaming is executed while the metallic mold is being fixed by a suction force, it becomes possible to prevent the metallic mold from being deformed during the defoaming process in which vacuum or decompression is applied to the airtightly closed space.

DETAILED DESCRIPTION

Figure 1:
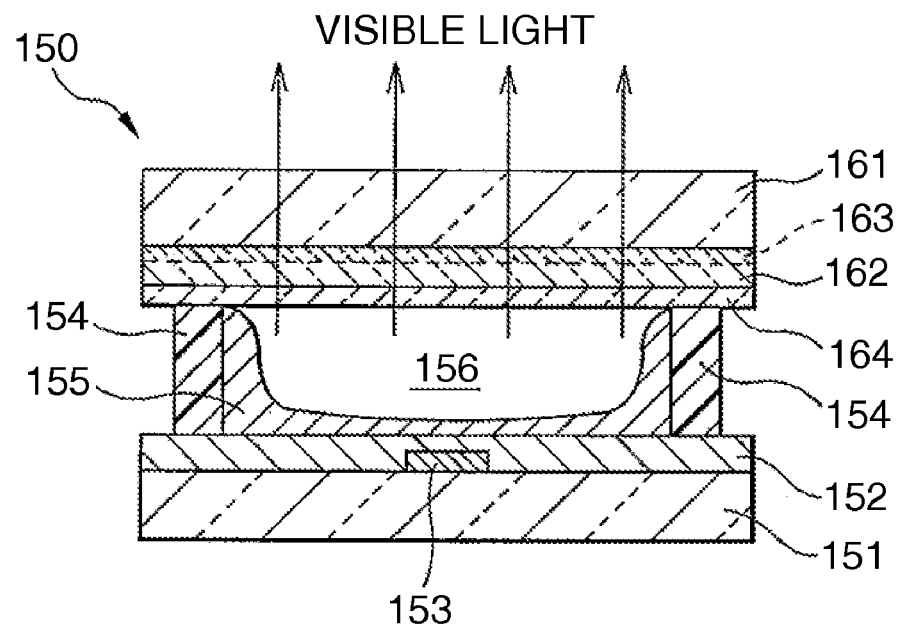
FIG. 1 is a sectional view schematically showing an example of the conventional PDP.

The defoaming method, the defoaming device and the transfer mold of the present invention can be advantageously executed in various embodiments. Referring to the manufacture of PDP rib which is a typical example of the fine structural body, an embodiment of the present invention will be explained in detail centering around the manufacture of a flexible transfer mold. In this connection, the transfer mold, to which the defoaming method and the defoaming device of the present invention can be applied, is not necessarily limited to a flexible mold but the transfer mold can be applied to other types of molds, for example, rigid molds. Further, the use of the transfer mold of the present invention is not necessarily limited to the manufacture of PDP ribs but the transfer mold can be used for the manufacture of other fine structural bodies.

Before the defoaming method and the defoaming device of the present invention are explained, explanations will be made with regard to a flexible mold for which the defoaming method and the defoaming device are advantageously used in the manufacture of the mold.

The flexible mold usually includes: a support body formed of a hard plastic film; and a shaping layer which is also referred to as a forming layer, which is supported by the support body, on the surface of which a groove pattern (groove portions) is provided. The forming layer is usually formed out of a photocurable resin material. In general, the plastic film used as a support body is a sheet made of plastics. This plastic film is commercially available in the form of a roll.

Examples of the plastic material preferably used for the support body are: polyethylene terephthalate (PET), polyethylene naphthalate (PEN), extended polypropylene, polycarbonate and triacetate. Especially, PET film is useful for the support body. For example, a polyester film such as a Tetron (registered trademark) film can be advantageously used for the film support body. The plastic films described above may be used as a single layer film, or alternatively, the plastic films may be used as a compound film or a laminated film when two or more types of plastic films are combined with each other.

Thickness of the above plastic films or the other support bodies may be variously changed depending upon the structure of the mold and PDP. However, the thickness is usually in the range from about 0.05 to 1.0 mm, preferably in the range from about 0.1 to 0.4 mm. In the case where the thickness of the support body is out from the above range, the handling property is lowered. The larger the thickness of the support body is, the more advantageously the mechanical strength is enhanced. It is preferable that the support body is optically transparent. In the case where the support body is optically transparent, as light irradiated for curing can be transmitted through the support body, it becomes possible to form a shaping layer by using a photocurable resin material.

The flexible mold of the present invention includes a shaping layer provided on the support body, in addition to the support body as described above. As explained in detail below, on the surface of the shaping layer, a groove pattern is provided which corresponds to ribs on PDP back plate, which is manufactured by using this mold, or corresponds to protrusions of the other fine structural bodies. The shaping layer is usually formed of a single layer, however, when necessary, it may be formed from a multiple layer structure including two or more types of materials, the properties of which are different from each other. In this connection, when consideration is given to a case in which a photocurable forming material is used, it is preferable that both the support body and the shaping layer are transparent.

Figure 4:
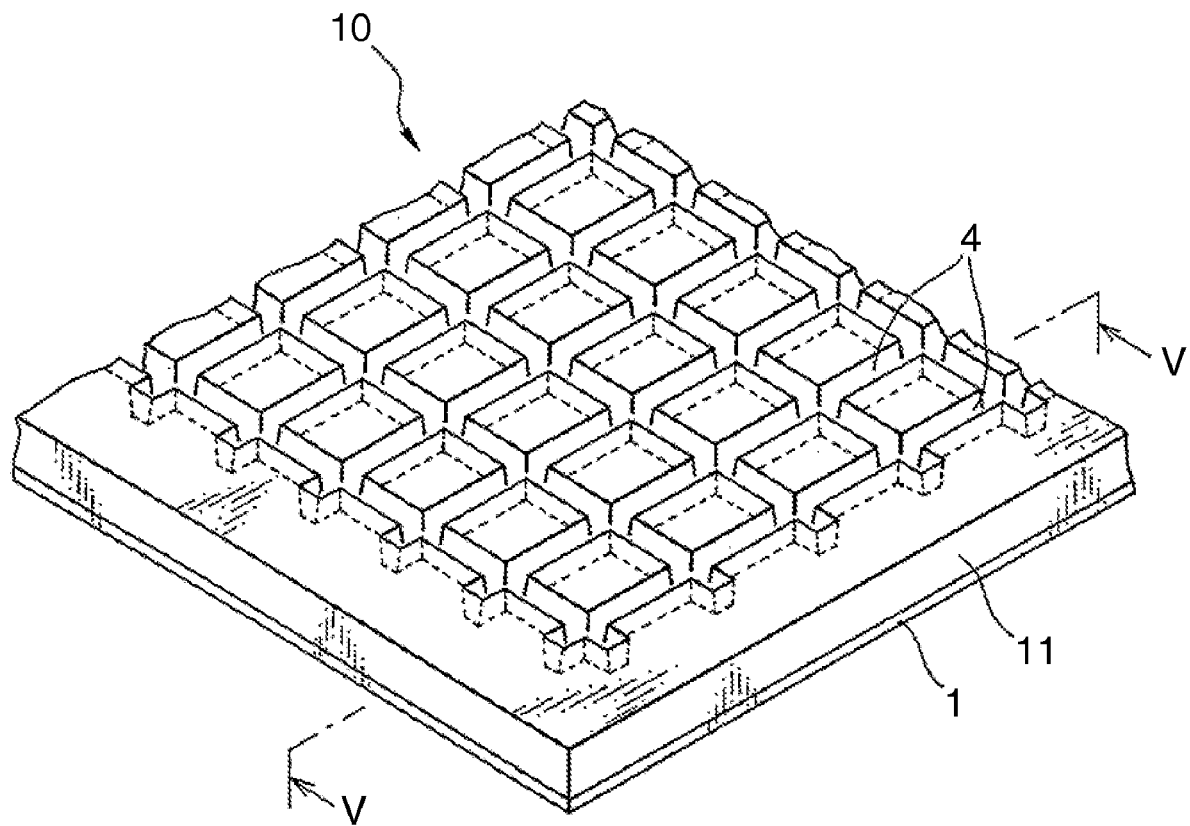
FIG. 4 is a perspective view showing an embodiment of the flexible transfer mold of the present invention.
Figure 5:
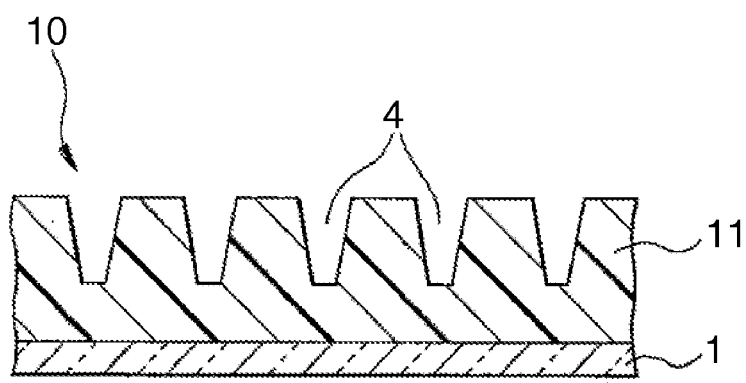
FIG. 5 is a sectional view taken along line V-V of the transfer mold shown in FIG. 4.

FIG. 4 is a partial perspective view schematically showing a preferred embodiment of the flexible mold of the present invention. FIG. 5 is a sectional view taken along line V-V in FIG. 4. As can be understood from these drawings, in this flexible mold 10, a plurality of ribs cross each other being arranged in parallel with each other at regular intervals. That is, this flexible mold 10 is used for manufacturing a back glass substrate of a lattice-shaped rib pattern.

As shown in the drawings, on the surface of the flexible mold 10, a groove pattern having the predetermined shape and size is provided. The groove pattern is a lattice-shaped pattern composed of a plurality of groove portions which are arranged substantially in parallel with each other at regular intervals being crossed with each other. Of course, the flexible mold 10 can be applied to the manufacture of the other fine structural bodies. However, since the groove portions of the lattice pattern, which are open as described above, are provided on the surface, for example, the flexible mold 10 can be advantageously used for forming PDP ribs having a lattice-shaped protrusion pattern.

When necessary, the flexible mold 10 may have an additional layer. Further, each layer composing the flexible mold 10 may be subjected to an arbitrary processing or fabrication. However, as shown in FIG. 4, the flexible mold 10 basically includes: a support body 1; and a shaping layer 11, on the surface of which the groove portions 4 are provided, formed on the support body 1. As already explained before, the support body 1 can be advantageously formed from a plastic film.

It is preferable that the shaping layer 11 is made of a cured product of the curable resin material. The curable resin material is a thermosetting resin material or a photocurable type resin material. Especially, the photocurable type resin material is useful because it is unnecessary to use a long heating furnace when a shaping layer is formed and further it is possible to end the curing in a relatively short period of time. Preferred examples of the photocurable resin material are: a photocurable monomer and oligomer, more preferably, an acrylic monomer and an acrylic oligomer. The curable resin material may contain an arbitrary additive. Examples of the appropriate additive are: a polymerization starting agent such as an optical polymerization starting agent; and an antistatic agent.

Examples of the acrylic monomer preferably used for forming a shaping layer are: urethane acrylate, polyether acrylate, acrylic amide, acrylonitrile, acrylic acid and ester acrylate. Examples of acrylic oligomer preferably used for forming a shaping layer are: urethane acrylate oligomer and epoxy acrylate oligomer. Especially, urethane acrylate and its oligomer can provide a soft and strong cured product after curing thereof. Further, as a hardening speed of acrylate is very high among others, it becomes possible to make a contribution to an enhancement of the productivity of the mold. Further, when the above acrylic monogomer or oligomer is used, the resulting shaping layer becomes optically transparent. Accordingly, when PDP ribs or other fine structural bodies are manufactured, it becomes possible to use a photocurable forming material in the production of the flexible mold provided with the above shaping layer. In this connection, the above acrylic monomer or oligomer may be used alone, or, alternatively, they may be used in combination of two or more.

The flexible mold of the present invention can be manufactured by various technical methods. Further, in the process of the manufacturing the mold, it is possible to introduce the defoaming method and the defoaming device of the present invention. For example, the flexible mold shown in FIGS. 4 and 5 can be advantageously manufactured by the procedure shown in FIGS. 6A to 6F in order.

Figure 6A:
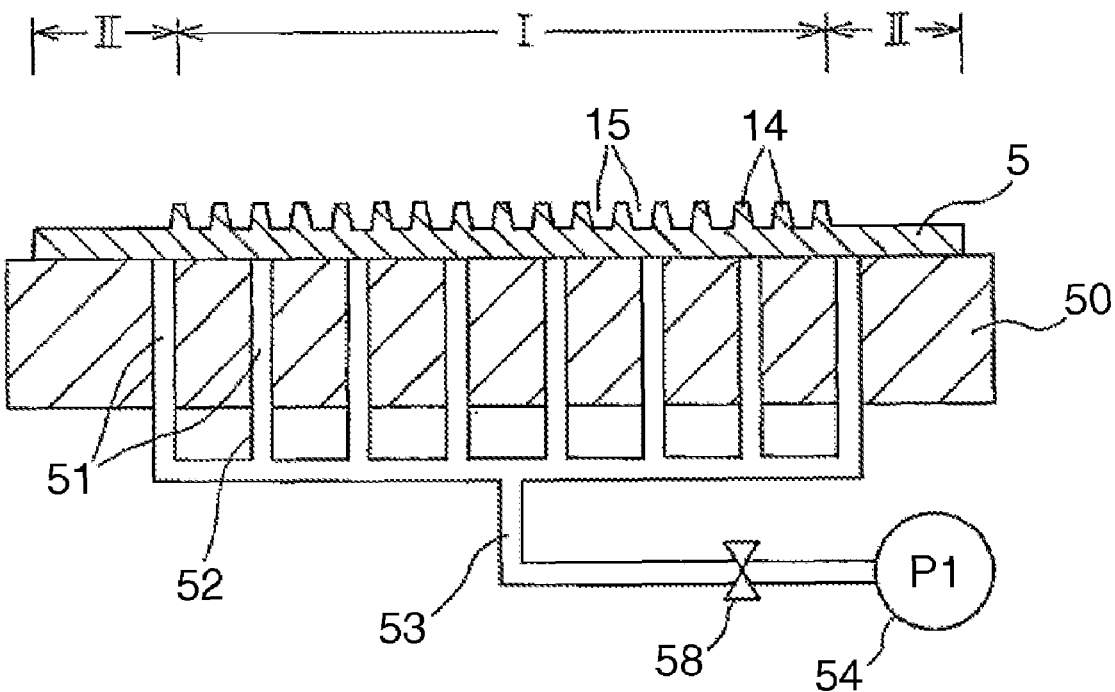
FIGS. 6A to 6F are sectional views showing a method of manufacturing a flexible transfer mold of the present invention in order.

First, as shown in FIG. 6A, a metallic mold 5 is prepared, the shape and the size of which correspond to a PDP substrate to be produced. The metallic mold 5 is usually an inter-tool reproduced from a master tool (a mother mold). In order to make it easy to release the inter-tool from the master tool, it is preferable that the inter-tool itself is also flexible. The metallic mold may be integrally formed from metallic material or resin material, or alternatively, it may be formed from a metal mold consisting of a plurality of layers in which a layer made of resin material or metallic material having fine irregularity structure is applied on a plate-shaped substrate made of metallic material or resin material. Examples of the substrate are: metallic material such as stainless steel, aluminum, magnesium or zinc; and resin material such as PET or PEN. Examples of the material having irregularities are: resin material such as silicone resin acrylic resin, or urethane resin; and metallic material such as stainless steel or aluminum. The metallic mold is usually a flat rectangular plate, the thickness of which is small and the surface area of which is large. For example, a size of the metallic mold is about 0.5 to 5 mm (thickness)×about 500 to 2000 mm (length and width).

On a surface of the metallic mold 5, separation walls (protrusions) 14 are provided, the pattern and the shape of which are the same as those of the ribs of the back plate for PDP. Accordingly, a space (recess portion) 15 defined by the adjoining separation walls 14 becomes a discharge display cell of PDP. In the present invention, in this metallic mold 5, the region having a fine irregularity structure will be referred to as a fine structural region I, and the region not having an irregularity structure, which is provided in the periphery of the fine structural region I, will be referred to as a flat region II. As explained below, a curable resin material is applied to the irregularity structure of the fine structural region I, thereby forming a mold provided with the ribs upon hardening of the curing resin material. In this connection, it should be noted that, in the present invention, the following problems are solved. When the resin material is filled into the plate-shaped metallic mold 5, small air bubbles are mixed in resin material, and, further, air bubbles are involved and remained in a gap formed between the filled resin material and the irregularity structure of the metallic mold.

As the metallic mold 5, the shape of which is the same as that of the final ribs, is provided, it becomes unnecessary to execute processing of end portions of the ribs after the ribs have been formed. Therefore, there is no possibility that defects are caused by the fragments generated in the processing of the end portions of the ribs. Further, according to the present manufacturing method, as all the resin material for making the ribs is hardened, a quantity of residues of the resin material on the metallic mold is very small, and therefore, it is easy to reuse the metallic mold.

As shown in the drawing, the metallic mold 5 is set on the mold platen 50. The mold platen 50 can be made of various materials. As long as a large number of suction holes can be formed in the mold platen, the material used is not limited to a specific one. Preferable examples of the material of the mold platen are: graphite, stone, ceramics and steel.

Figure 6D:
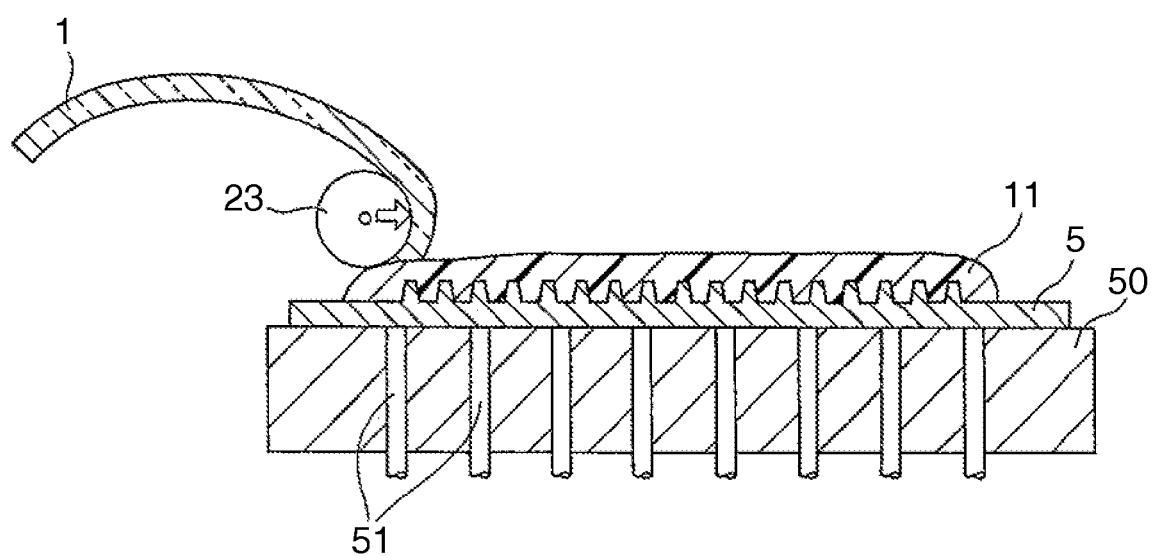
Figure 7:
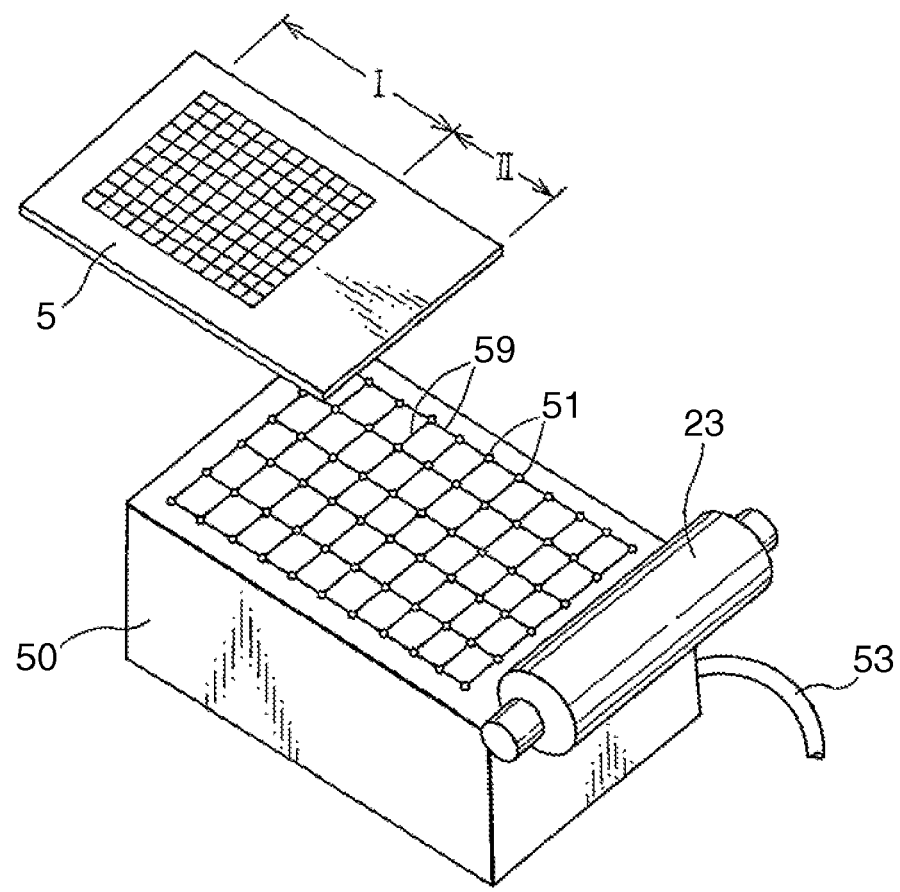
FIG. 7 is a perspective view showing a method of setting a metallic mold on a mold platen according to the present invention.

As can be understood from FIG. 7 showing a state in which the metallic mold 5 is set on the mold platen 50, suction holes 51 penetrating in the thickness direction of the mold platen 50 are provided in the mold platen 50. An upper end face of each suction hole 51 is open onto the surface of the mold platen 50. In this connection, in the illustrated example, open end portions of the suction holes, which are adjacent to each other, are communicated with each other by the groove 59. A shape of the groove 59 is not particularly limited to a specific shape. For example, examples of the shape of the groove 59 are: a V-shape, a square-shape and a U-shape. When the thin grooves are combined with the suction holes, the metallic mold can be suctioned onto the surface plate, with the effect of fixing the metallic mold onto the mold platen being more uniformed and enhanced. In this connection, the laminate roller 23 shown in FIG. 7 is used for pressing a sheet-shaped support film, which is used as a support body of the mold, to the metallic mold 5 as shown in FIG. 6D.

The suction holes 51 formed in the mold platen 50 are communicated with at least one first vacuum device. In the illustrated example, the suction holes 51 are connected to one conduit tube 53 through the respective conduit tubes 52 and further connected to one vacuum pump (or a decompression pump) 54. For example, the vacuum pump 54 is a rotary type vacuum pump. In this case, the conduit tubes 52 are laid in parallel with each other, however, the conduit tubes 52 may be laid in series to each other. The conduit tubes 52 and 53 may be made of plastics or metal. It is preferable that a pressure regulating valve 58 is arranged in the middle of the conduit tube 53 so as to appropriately adjust a suction force transmitted from the vacuum pump 54. The number of vacuum pumps 54 may be two or more according to the necessity. However, in the practice of the present invention, one vacuum pump 54 can sufficiently exhibit its function. Another vacuum device may be installed, instead of the vacuum pump 54.

The pressure regulating valve used for the present invention will be explained here. For example, explanations will be made into the pressure regulating valve 58 attached to the conduit tube 53 connected to the vacuum pump 54. Explanations will be also made into the pressure regulating valve 68 attached to the conduit tube 62 connected to the vacuum pump 63. When the pressure regulating valve is used in the practice of the present invention, it can function as a vacuum release suction regulating valve. The function as a vacuum release suction regulating valve is described as follows. When the inside of the device, which has been maintained in a vacuum state, is returned to the atmospheric pressure after the completion of vacuum defoaming, if the suction is quickly executed, the resin material filled in the 3-dimensional pattern of the fine structural region is blown away. However, when the pressure regulating valve is arranged according to the present invention, the suction can be executed little by little. When this pressure regulating valve is operated, it becomes possible to execute the suction without giving a bad influence on the filled resin material. Further, when a filter is combined with and attached to an end portion of the pressure regulating valve, it becomes possible to prevent foreign substances from entering into the airtightly closed space.

In the setting of the metallic mold 5 on the mold platen 50, the metallic mold 5 can be set so that all the suction holes 51 on the mold platen 50 are blocked with the mold 5. When all of the suction holes 51 are not closed with the mold 5, the not-closed suction holes 51 may be closed with a stopper such as rubber stopper. According to this structure, when the first vacuum device is operated, the metallic mold 5 can be stably set on and fixed to the mold platen 50. Further, it becomes possible to prevent air and an uncured resin material from spreading onto the back side of the metallic mold 5. Furthermore, it becomes possible to prevent the metallic mold 5 from being bent into "C-shape" when a suction force of the first suction device becomes lower than a suction force of the second vacuum device (explained later).

Figure 8:
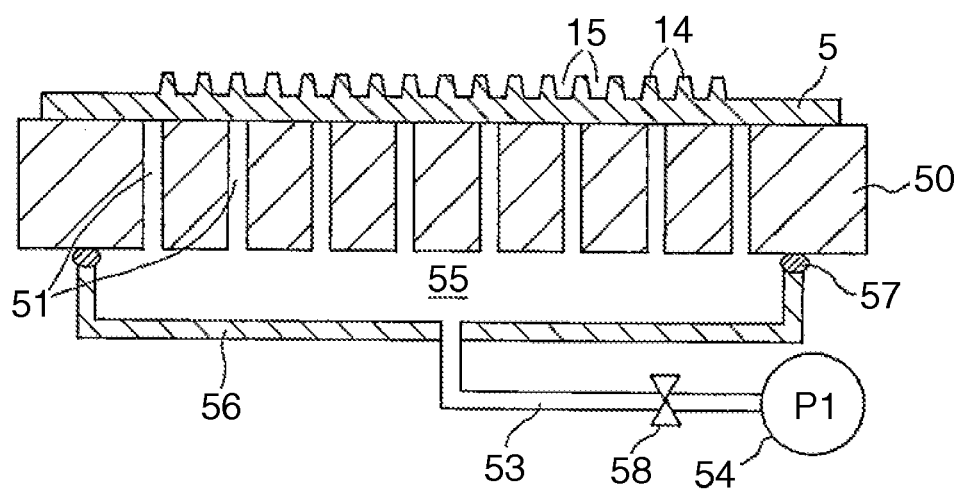
FIG. 8 is a sectional view showing another preferred embodiment of the mold platen used in the present invention.

As explained above referring to FIG. 6A, the suction holes 51 formed on the mold platen 50 are collected and connected to one conduit tube 53. Then, one vacuum device (vacuum pump) 54 is connected to the conduit tube 53. However, in the practice of the present invention, it is possible to employ other embodiments. A preferred embodiment will be described as follows. For example, the suction holes formed on the mold platen are collected and connected to one auxiliary airtightly closed space formed below the mold platen and one vacuum device is applied to the auxiliary airtightly closed space. This embodiment is shown in FIG. 8, and as is illustrated, the auxiliary airtightly closed space 55 is formed below the mold platen 50. The airtightly closed space 55 can be formed in such a manner that a housing 56 made of, for example, plastics or metal is attached onto a bottom face of the mold platen 50 so that all the lower opening portions of the suction holes 51 can be included in the housing 56. In order to ensure an airtightly closed structure between the mold platen 50 and the housing 56, it is preferable to arrange an arbitrary sealing means 57 between both of them. In this connection, in the illustrated example, an O-ring made of silicone rubber is used for the airtightly sealing means 57. In order to ensure the airtight contacting property (sealing property), the O-ring to be used is preferably made of a soft material. However, in view of the chemical resistant property and the abrasion resistant property, it is preferable to use fluorine resin such as silicone rubber.

Figure 6B:
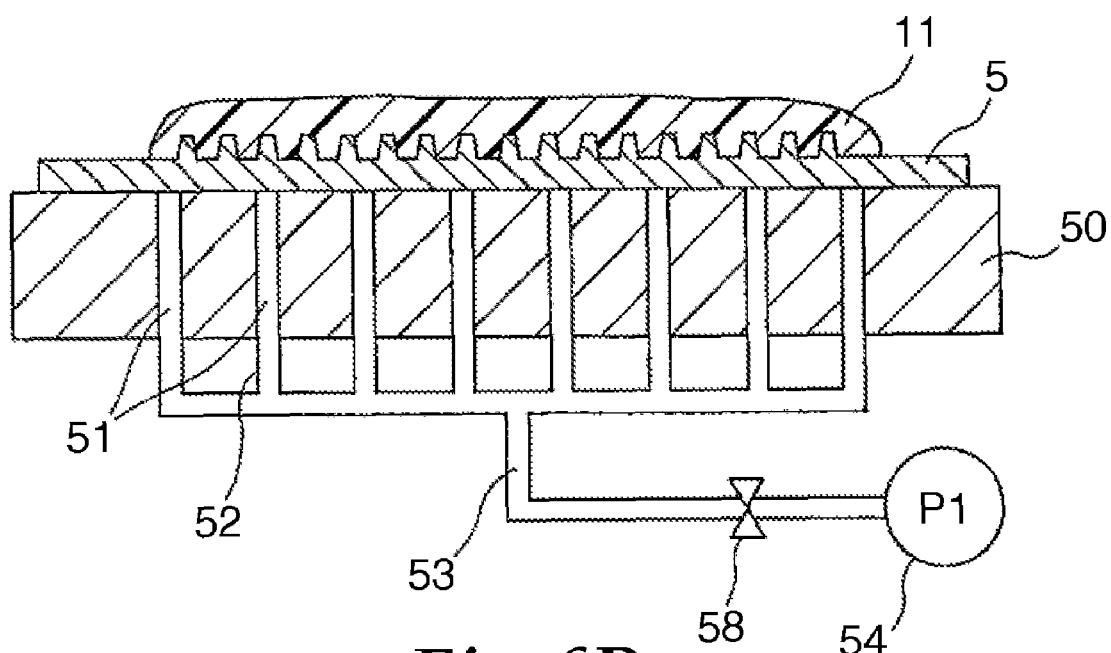

Next, as shown in FIG. 6B, a curable resin material 11 is applied to the fine structural region of the metallic mold 5 so as to fill the irregularity structure with the resin material. In this case, the resin material 11 can be applied by an arbitrary method. For example, a predetermined quantity of resin material can be coated onto the metallic mold 5 by a well known and conventional coating means (not shown) such as a knife coater or a bar coater. As the resin material was explained in detail in the above description of the transfer mold, the explanations will be omitted here.

Figure 6C:
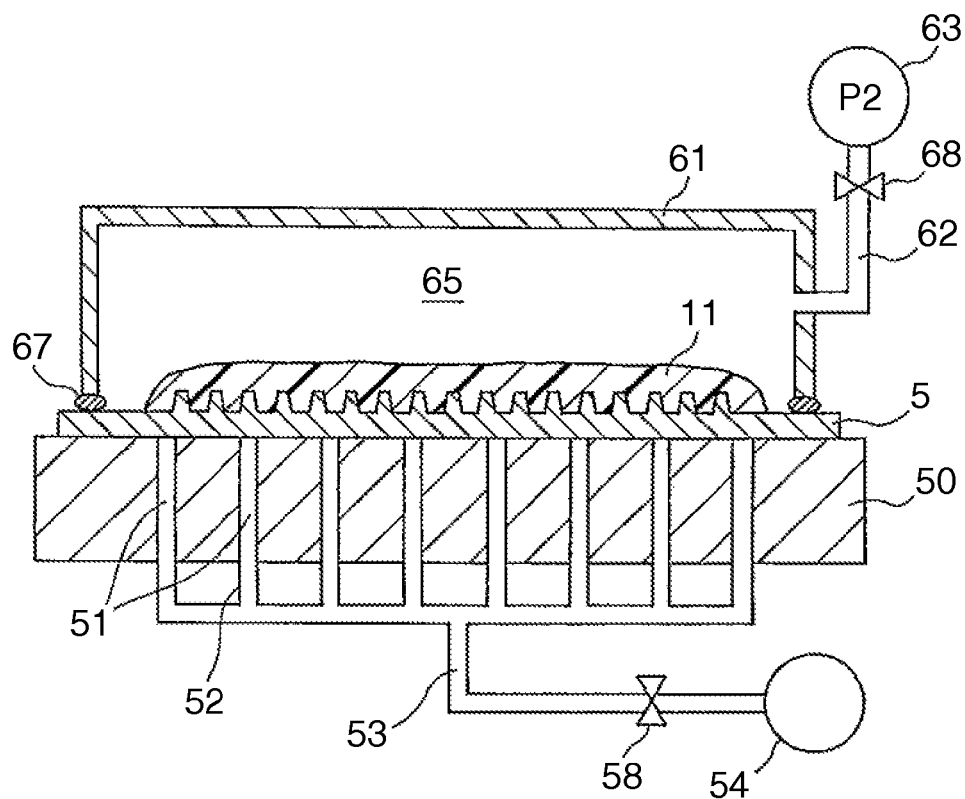

Successively, as shown in FIG. 6C, a lid body 61 is applied on an upper face of the metallic mold 5. The lid body 61 is arranged in such a manner that it can exclusively covers only the fine structural region, and has a shape and a size sufficient for defining one airtightly closed space 65. Further, the lid body 61 is provided with at least one second vacuum device communicated with the airtightly closed space 65. The lid body 61 can be formed from a housing made of plastics or metal. When consideration is given to the rigidity, the light weight property, the corrosion resistant property and the solvent resistant property, the lid body 61 is preferably made of metal, and it is advantageous that the lid body 61 is made of aluminum. Further, in order to downsize the defoaming device and also in order to quickly exhibit the suction effect provided by the vacuum device 63, it is preferable that a size of the airtightly closed space defined by the lid body 61 is reduced as small as possible. Therefore, concerning the size of the lid body 61, the length and the width of the lid body 61 are smaller than those of the metallic mold 5. However, it is preferable that the size of the lid body 61 is a little larger than that of the fine structural region of the metallic mold 5 (see, Region I in FIGS. 6A and 7). Similarly, concerning the height of the lid body 61, it is preferable that the height is determined at a value so that a small space can be generated on the resin material 11 filled in the metallic mold 5. For example, it is preferable that the height of the lid body 61 is determined so that a distance between the upper face of the resin material 11 and the inner wall of the ceiling portion of the lid body 61 can be about 20 to 150 mm. Furthermore, although not shown, in order to prevent an undesirable spread of the resin material on the surface of the metallic mold, a frame body made of plastics or metal may be further provided on the outer circumference of the fine structural region and inside the lid body. This frame body can function as a barrier or a dam for preventing the resin material from undesirably spreading. When the frame body is not used, the lid body 61 may exhibit an additional function as the frame body. Further, in order to ensure an airtight structure between the lid body 61 and the flat portion of the mold platen 50, it is preferable that an arbitrary sealing means 67 is provided between both of them. In this connection, in the illustrated example, an O-ring made of silicone rubber is used as the sealing means 67.

As shown in the drawing, the airtightly closed space 65 formed from the lid body 61 is connected to one vacuum device (vacuum pump) 63 through one conduit tube 62. In the middle of the conduit tube 62, the pressure regulating valve 68 is arranged. When necessary, the number of the vacuum pump 63 may be two or more. Alternatively, instead of providing two vacuum pumps 54 and 63, one vacuum pump may be provided and shared in common and a container which is vacuumed by a valve and others may be used. Further, when necessary, instead of the vacuum pump 63, another vacuum device may be provided.

Figure 9:
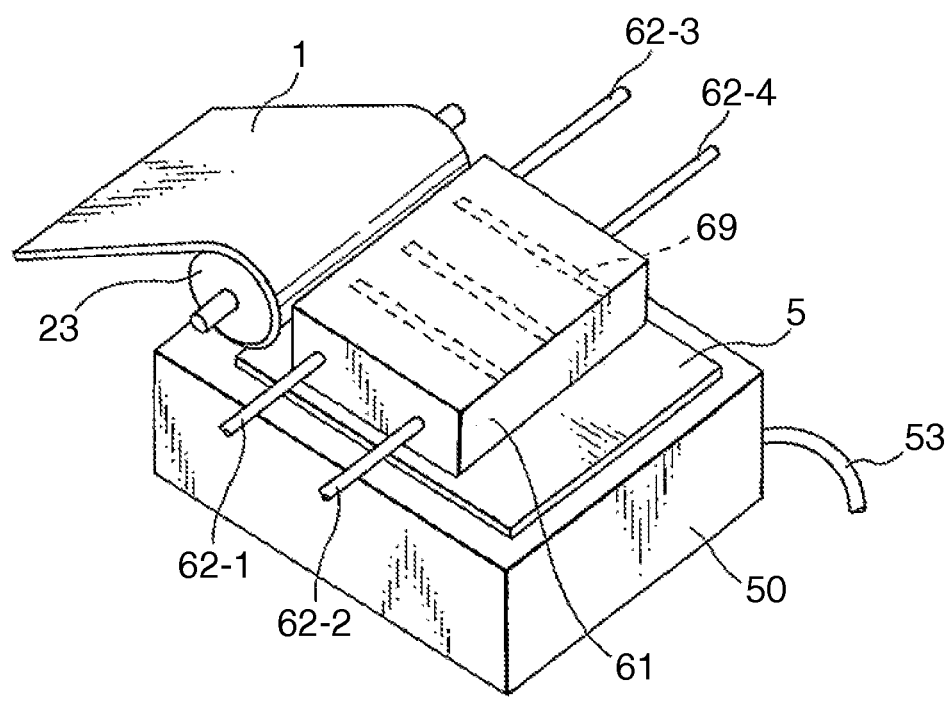
FIG. 9 is a perspective view showing a method of arranging a lid body on a mold platen according to the present invention.

Application of the lid body 61 on an upper portion of the metallic mold 5 will be more clearly understood by referring to FIG. 9. FIG. 9 is a perspective view showing an entire defoaming device. The mold platen 50 is provided with a laminate roller 23 which is used to laminate a sheet-shaped support body 1 in the later laminate step. A lid body 61, which is arranged on the metallic mold 50 and covers the fine structural region, is connected to conduit tubes 62-1, 62-2, 62-3 and 62-4 which are respectively connected to a vacuum pump (not shown). The number of the conduit tubes may be one (1) or may be two or more. Although not shown, each conduit tube is provided with a pressure regulating valve for regulating a suction force transmitted from the vacuum pump. In an upper portion of the lid body 61, rod-shaped reinforcing members 61 are provided so as to hold the side walls opposed to each other and also to hold the lid body shape stably. This is because if no reinforcing member is provided, a ceiling portion and side wall portions of the lid body are deformed by the decompressing force generated during defoaming process.

FIG. 6C is a view showing an embodiment in which one lid body 61 is attached onto the mold platen 50 to form an airtightly closed space 65. However, in the practice of the present invention, it is possible to employ another embodiment. One preferred embodiment is described as follows. A lid body is formed into a rectangular shape including a transparent ceiling portion and transparent, semitransparent or opaque side wall portions, and sealing means are provided in a contact portion of the side wall portion with the metallic mold.

Figure 10:
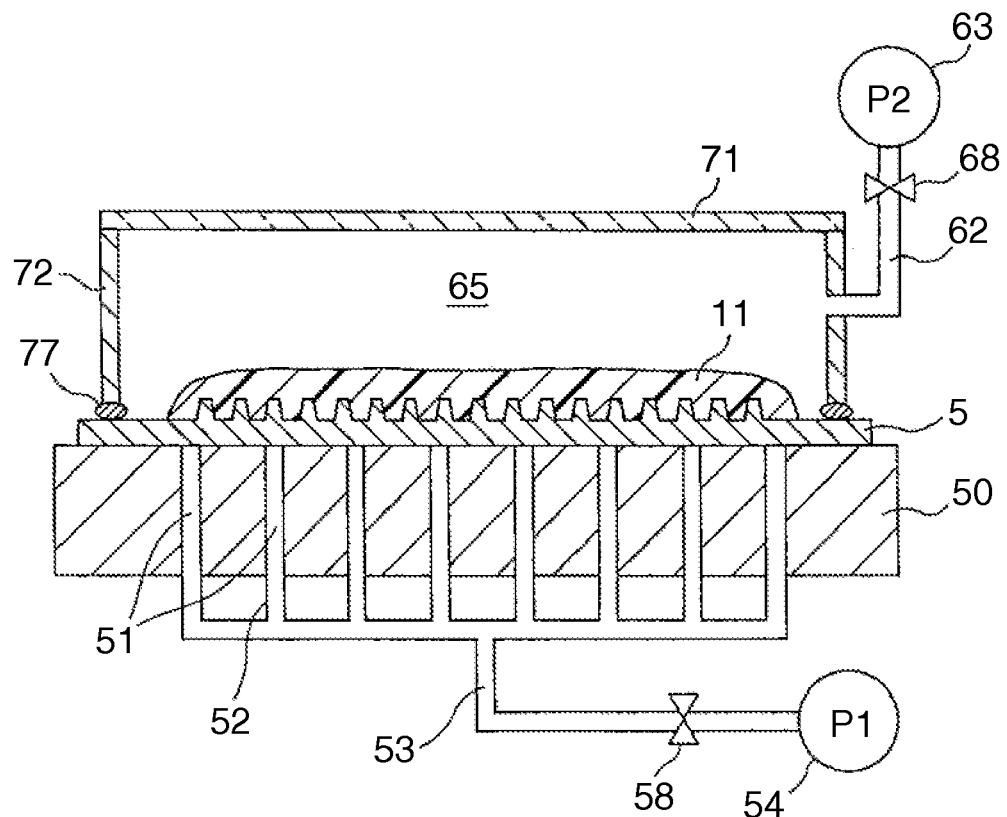
FIG. 10 is a sectional view showing still another preferred embodiment of the lid body used in the present invention.

FIG. 10 is a view showing such an embodiment. The lid body is formed out of a ceiling portion 71 and a side wall portion 72 into a rectangular shape. In order to visually observe a state inside the lid body, especially in order to visually observe a defoaming state, it is preferable that the ceiling portion 71 is made of a transparent resin material. Since the ceiling portion 71 is deformed by a decompression caused at the time of defoaming, the rigidity is required for the ceiling portion 71. In order to ensure the rigidity, it is necessary to give consideration to the material and thickness of the ceiling portion 71. Therefore, in the practice of the present invention, from the viewpoints of the rigidity, the visibility and the manufacturing cost, vinyl chloride resin is preferable used for the ceiling portion. On the other hand, it is unnecessary that the side wall portion 72 is transparent. The side wall portion 72 may be either transparent, semitransparent or opaque. In order to ensure a sufficiently high airtightly condition, it is preferable that an arbitrary sealing means 77 is arranged in a contact portion of the side wall portion 72 with the metallic mold 5. Although not shown, an adhesive tape may be stuck onto the contact portion of the side wall portion 72 with the metallic mold 5. The airtightly closed space 65 is connected to the vacuum pump (decompression pump) 63 through the conduit 62, and in the middle of the conduit tube 62, the pressure regulating valve 68 for regulating a suction force given from the vacuum pump 63 is arranged. Although not shown, in the ceiling portion 71, a rod-shaped reinforcing members is provided so as to hold the side walls 72 opposed to each other and also to hold the lid body shape stably.

As shown in FIG. 6C (or FIG. 9 or 10), after the lid body 61 has been arranged in a predetermined region on the metallic mold 5, the defoaming step is executed. According to the present invention, when the suctioning operation is executed by the first vacuum device 54, the metallic mold 5 can be stably held on the mold platen 50, and, at the same time, in the airtightly closed space 65 formed when the lid body 61 is set, the suctioning operation is executed by the second vacuum device 63 communicated with the airtightly closed space 65, and due to this suctioning operation, the airtightly closed space 65 can be decompressed. When the airtightly closed space 65 is decompressed as described above, the suction force generated by the first vacuum device 54 and that generated by the second vacuum device 63 function being well balanced to each other. Therefore, while a deformation of the metallic mold 5 and an intrusion of the resin material 11 into between the metallic mold 5 and the mold platen 50 are being prevented, it becomes possible to completely remove air bubbles contained in the resin material 11 and included between the resin material 11 and the irregularity structure of the metallic mold 5. It is preferable that the suction force generated by the first vacuum device 54 is stronger than the suction force generated by the second vacuum device 63. Alternatively, the suction force generated by the first vacuum device 54 and the suction force generated by the second vacuum device 63 are made to be the same and the time of attaining the ultimate vacuum by the first vacuum device 54 and the time of attaining the ultimate vacuum by the second vacuum device 63 may be shifted. These constitutions also help to prevent a deformation of the metallic mold 5. In this connection, after the explanations of the later steps have been completed, the defoaming step will be explained in more detail.

Figure 6E:
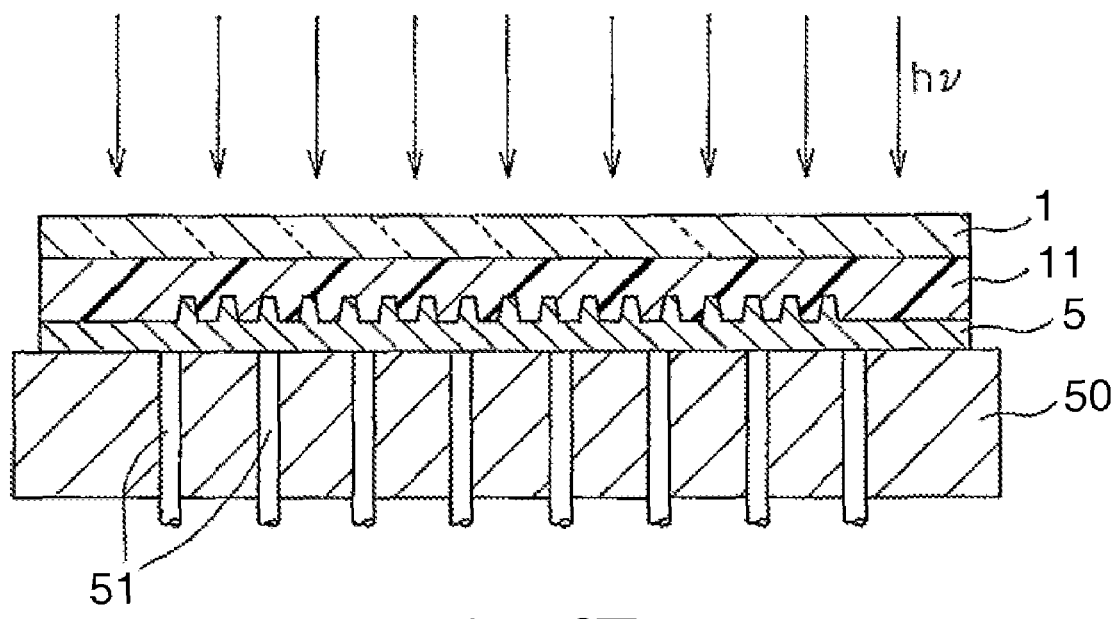

After the completion of the defoaming step, as shown in FIG. 6D, the sheet-shaped supporting body 1 used as a supporting body in the manufacture of the transfer mold is laminated on the defoamed resin material 11 to form a laminated body in which the metallic mold 5, the resin material 11 and the supporting body 1 are integrally laminated on each other. The sheet-shaped supporting body 1 is preferably formed from a transparent plastic film. This sheet-shaped supporting body 1 will be referred to as a supporting film, hereinafter. The supporting film 1 is formed from a polyester film or a transparent plastic film which has been explained in detail in the paragraphs of the supporting body of the flexible mold. The laminate roller 23 is used for pressing the supporting film 1 to the metallic mold 5. The laminate roller 23 can be formed from a rubber roller or other rollers, that is, the laminate roller 23 is not particularly limited to a specific roller. When necessary, instead of the laminate roller, another well known conventional laminate means may be used. Next, the laminate roller 23 is slid on the metallic mold 5 in the arrowed direction. As a result of this laminate treatment, as shown in FIG. 6E, the supporting film 1 is laminated on a layer at the resin material 11. At the same time, a layer of the resin material 11 is uniformly distributed at a predetermined thickness and intervals between the separation walls 14 are filled with resin material 11.

After the laminate treatment has been completed, as shown in FIG. 6E, under the condition that the supporting film 1 is laminated on the metallic mold 5, the resin material 11 is irradiated with light (hυ) through the supporting film 1. In this case, the supporting film 1 does not contain light diffusion elements such as air bubbles but it is uniformly formed from a transparent material. Therefore, the irradiation light is seldom attenuated and can reach the resin material uniformly. As a result, the resin material can be effectively cured to form a uniform shaping layer 11 stuck onto the supporting film 1. Accordingly, it is possible to obtain a flexible mold in which the supporting film 1 and the shaping layer 11 are integrally joined to each other. In this connection, in this step, for example, it is possible to use ultraviolet rays, wavelength of which is, for example, 350 to 450 nm. Therefore, it is possible to provide such an advantage that a light source generating heat like a high pressure mercury lamp is not used. Further, when the resin material is cured by light, as the supporting film and the shaping layer are not thermally deformed, it becomes possible to control a pitch size at a high precision level.

Figure 6F:
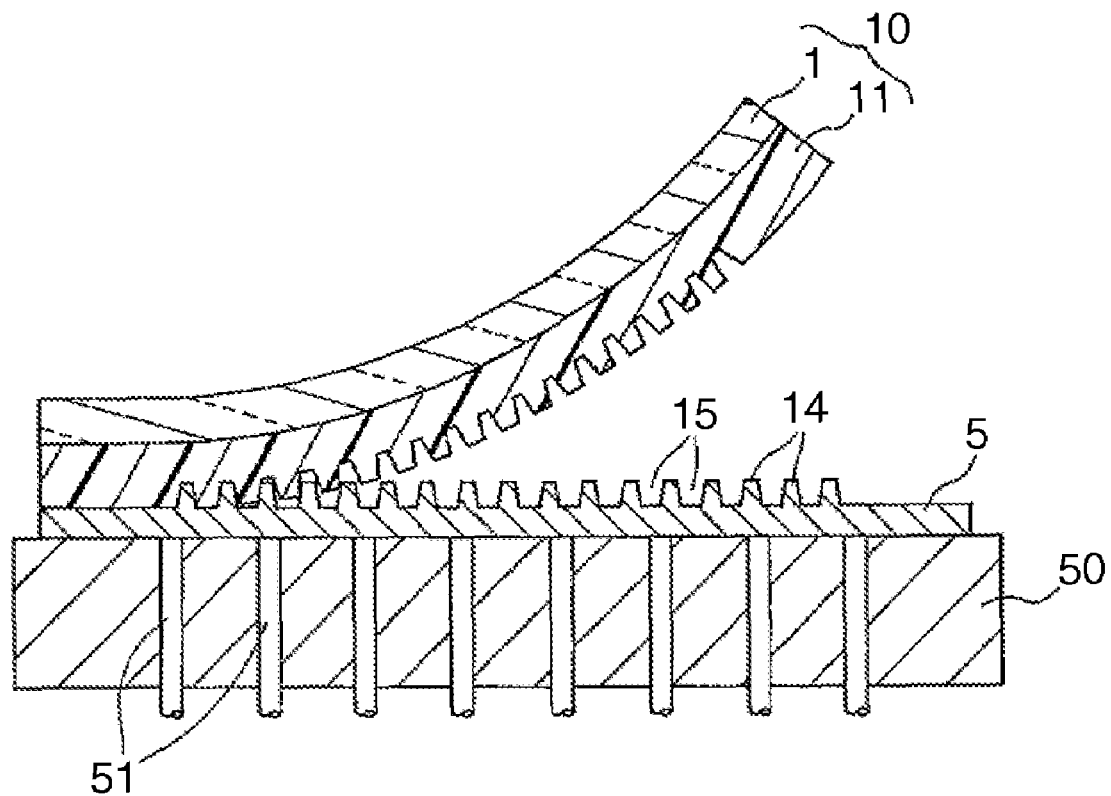

Thereafter, as shown in FIG. 6F, the flexible mold 10 composed of the supporting film 1 and the shaping layer 11 is separated from the metallic mold 5 while its integrality is being maintained. The used metallic mold 5 may be cleaned when necessary in order to repeatedly use.

Successively, the defoaming step of the present invention will be explained in more detail.

As can be understood from the previous explanations, the defoaming step of the present invention principally relies on:

a metallic mold fixing mechanism for fixing a thin large flat mold having an accurate 3-dimensional pattern region (fine structural region) onto a mold platen while maintaining a high flatness; and a vacuum defoaming mechanism for defining an airtightly closed space, the plane size of which is smaller than that of the flat mold and larger than that of the fine structural region, and capable of obtaining a high exhausting capacity and also obtaining a high degree of vacuum.

Specifically, the defoaming step of the present invention is not limited to the following shape and numerical values, however, the following two points are important.

(1) On a mold platen having a high flatness, a large number of through-holes (referred to as suction holes in the present invention) formed from the surface side to the back side, are created by means of laser beam drilling. For example, the suction holes, the diameter of which is 1 mm, are formed at the interval of 120 mm. A conduit tube is attached to each suction hole and an end portion of the tube is connected to a vacuum pump. When the vacuum pump is operated and a decompression is induced, a suction force is generated in the suction hole formed on the mold platen. By using this suction force, the flat mold is suctioned onto the mold platen, so that the flat mold can be suctioned onto the mold platen. During the transfer process after defoaming, no positional shift is caused while the flatness of the flat mold is being maintained, and thus it becomes possible to execute an accurate transfer.

(2) A vacuum case, which is referred to as a housing or a lid body in the present invention, is attached to the flat mold to form an airtightly closed space (vacuum space or decompressed space). The housing is put on a limited region (region covering a fine structural region) on the flat mold, after a photocurable resin is coated on the fine structural region on the flat mold. The vacuum case is connected to a vacuum pump through a conduit tube. When the vacuum pump is operated and a decompression is induced, while defoaming is being executed, irregularities in the fine structural region are filled with resin material. Usually, a high degree of vacuum is needed for defoaming. The vacuum case used in the present invention is smaller than the flat mold and larger than the fine structural region. Further, the vacuum case used in the present invention is provided with a high rigidity and a high sealing property capable of enduring a high degree of vacuum. Therefore, when inner diameters of the suction holes and the conduit tubes, which are connected to the suction holes, are increased or length of the conduit tube is decreased so as to reduce an exhaust tube resistance, it becomes possible to simultaneously ensure a high exhaust capacity and a high degree of vacuum.

Figure 2:
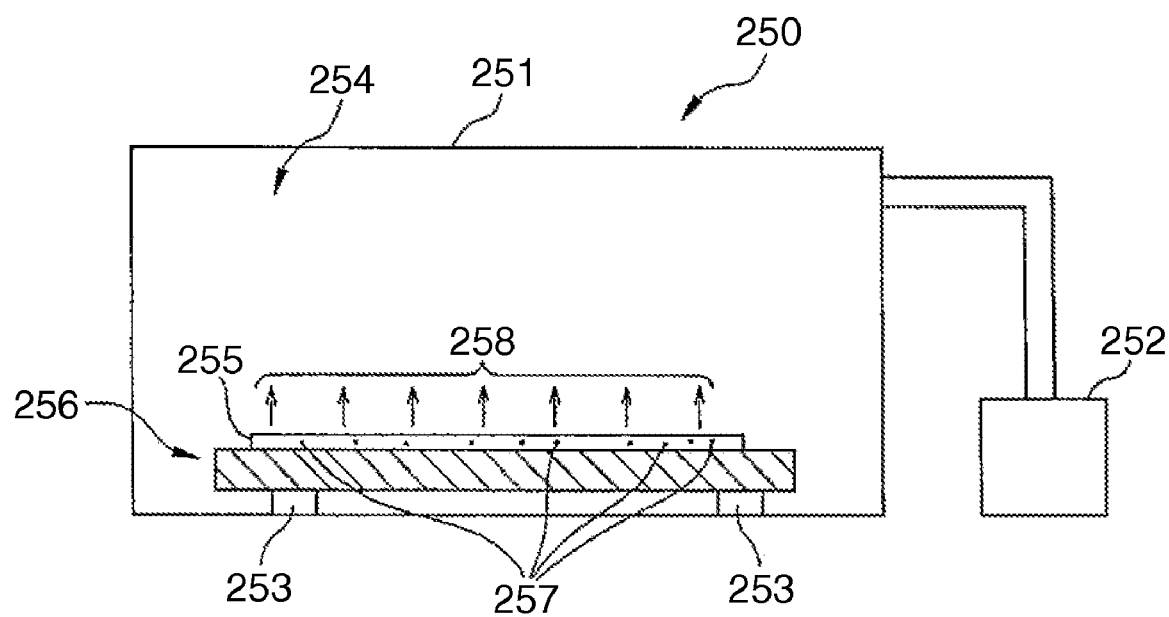
FIG. 2 is a sectional view schematically showing an example of the conventional method of manufacturing PDP.
Figure 3A:
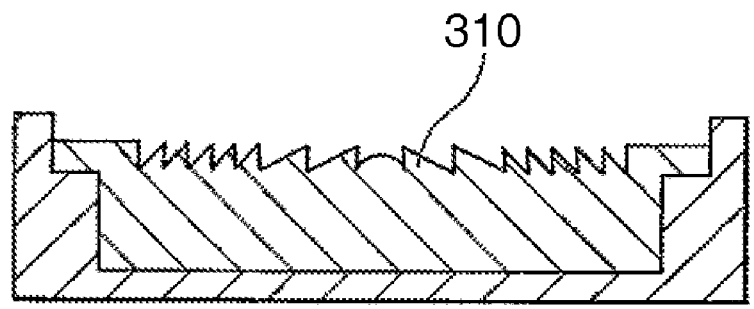
FIGS. 3A, 3B and 3C are sectional views successively showing a conventional method of manufacturing Fresnel's sheet in order.
Figure 3B:
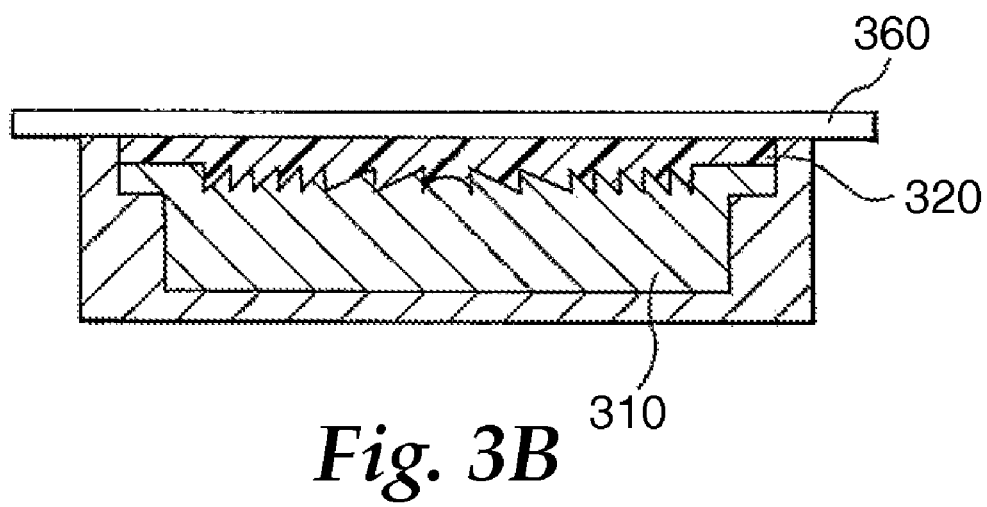
Figure 3C:
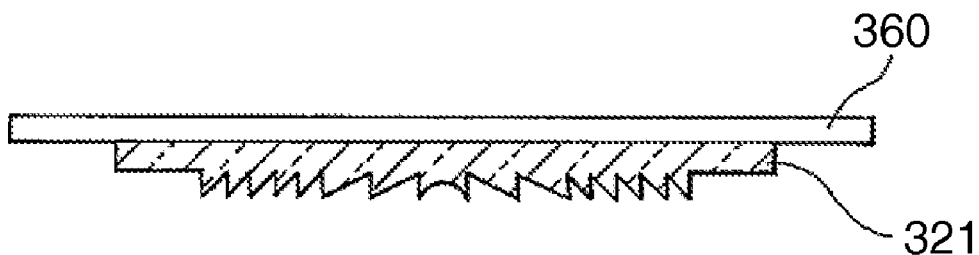

In addition to this, the present invention provides a method of manufacturing a fine structural body using a flexible mold of the present invention. There are various fine structural bodies produced in accordance with the present invention. A typical fine structural body is a PDP substrate (back plate) comprising ribs formed on a flat glass plate. A method of manufacturing the PDP substrate will be explained below. In this connection, in the practice of the present method, for example, a manufacturing device shown in FIGS. 1 to 3 of Japanese Unexamined Patent Publication (Kokai) No. 2001-191345 can be advantageously used.

First, a flat glass plate, on which electrodes are arranged in parallel with each other at a regular interval, is previously prepared and set on a mold platen. Next, a flexible mold of the present invention, on which a groove pattern is provided, is arranged at a predetermined position on the flat glass plate and then the flat glass plate and the mold are positioned to each other. Since the mold is transparent, it can be easily positioned to the electrodes on the flat glass plate. Successively, a laminate roller such as a rubber roller is set at one end portion of the mold. It is preferable that one end portion of the mold is fixed onto the flat glass plate. The reason is that a positional shift of the flat glass plate and the mold, which have been already aligned, can be prevented. Next, the other free end portion of the mold is lifted up by a holder and moved above the laminate roller in order to expose the flat glass plate.

Subsequently, a predetermined quantity of rib precursor necessary for forming the ribs is supplied onto the flat glass plate. For the supply of the rib precursor, for example, a hopper for paste having a nozzle is used. In this case, the rib precursor is an arbitrary forming material capable of forming the target ribs. As long as it is possible to form the target ribs, the rib precursor is not particularly limited to a specific material. The rib precursor may be thermosetting or photocurable. When the photocurable rib precursor is combined with the above transparent flexible forming mold, it can be very effectively used. An example of the preferred composition of the rib precursor essentially comprises (1) a ceramic component such as aluminum oxide for giving a shape of the rib; (2) a glass component such as lead glass or phosphate glass for filling a gap between the ceramic components, thereby giving tightness to the ribs; and (3) a binder component for receiving, holding and joining the ceramic components to each other and a hardening agent or a polymerization starting agent. It is preferable that the binder component is hardened by the irradiation of light without being heated.

Next, the laminate roller is moved on the mold at a predetermined speed. While the laminate roller is moving on the mold as described above, a force is given to the mold from one end portion to the other end portion in order by the self-weight of the laminate roller. Therefore, the rib precursor spreads between the flat glass plate and the mold. Accordingly, the groove portion of the mold is filled with the forming material. That is, the rib precursor is successively replaced with the air in the groove portion and filled into the groove portion in order.

Thereafter, the rib precursor is hardened. In the case where the rib precursor spread on the flat glass plate is photocurable, a laminated body of the flat glass plate and the mold is put into a light irradiation device and ultraviolet rays (UV) are irradiated to the rib precursor through the flat glass plate and the mold so that the rib precursor can be cured. In this way, the cured product of the rib precursor, that is, the rib itself can be obtained.

Finally, while the obtained rib is being stuck on the flat glass plate, the flat glass plate and the mold are taken out from the light irradiation device and then the mold 10 is removed by peeling. As the mold of the present invention is excellent in the handling property, the mold can be easily peeled and removed by a weak force without damaging the ribs stuck onto the flat glass plate. Of course, a large-scale device is not needed for this peeling and removing work.

The invention claimed is:

1. A defoaming method for removing air bubbles from a curable resin material and a contact portion of the resin material with an irregularity structure of a flat metallic mold which comprises a fine structural region having a fine irregularity structure and a flat region in the periphery of the fine structural region and which has the curable resin material applied to the irregularity structure of the fine structural region, thereby filling the irregularity structure with the resin material, the defoaming method comprising the steps of:
setting the metallic mold on a mold platen having suction holes, which penetrate the mold platen in the thickness direction, so that the suction holes are blocked by the metallic mold;
fixing the metallic mold onto the mold platen by suctioning it with at least one first vacuum device communicated with the suction holes; and
decompressing an airtightly closed space by suctioning it with by least one second vacuum device communicated with the airtightly closed space, the airtightly closed space being defined on an upper face of the fine structural region in the surface of the metallic mold, under the fixation of the metallic mold onto the mold platen, thereby conducting defoaming,
wherein at a start of the defoaming method a suctioning force generated by the first vacuum device is approximately the same as a suctioning force generated by the second vacuum device, and after the start of the defoaming method a time of attaining an ultimate vacuum force by the first vacuum device and a time of attaining the ultimate vacuum force by the second vacuum device are shifted such that the mold is defoamed and not deformed during the defoaming method.

2. A defoaming method according to claim 1, wherein the suction holes in the mold platen are connected to one conduit tube and one vacuum device is connected to the conduit tube.

3. A defoaming method according to claim 1, wherein the suction holes in the mold platen are connected to one auxiliary airtightly closed space formed below the mold platen and one vacuum device is connected to the auxiliary airtightly closed space.

4. A defoaming method according to claim 1, wherein the airtightly closed space is defined when a lid body, the shape and the size of which are sufficient to cover only the fine structural region, is set on a surface of the metallic mold.

5. A defoaming method according to claim 1, wherein the curable resin material is a photocurable resin material.

6. A defoaming method according to claim 1, wherein the metallic mold is used to produce a transfer mold used for transferring barrier ribs of PDP panel from the curable resin material.

* * * * *